US006604258B2

(12) United States Patent
Saggio et al.

(10) Patent No.: US 6,604,258 B2
(45) Date of Patent: Aug. 12, 2003

(54) CASTER ROLLER FOR CARGO HANDLING SYSTEM

(75) Inventors: Rosario S. Saggio, Arcadia, CA (US); Karlton Kazumi Okamoto, Lakewood, CA (US); Frank James Caldwell, Jr., Lakewood, CA (US); Behrooz Afghani, Huntington Beach, CA (US); James Gabauer, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/908,159

(22) Filed: Jul. 18, 2001

(65) Prior Publication Data

US 2003/0014833 A1 Jan. 23, 2003

(51) Int. Cl.⁷ .......................... B60B 33/00; A47B 91/00
(52) U.S. Cl. .............................. 16/48; 16/42 R; 384/58
(58) Field of Search ........................ 16/48, 42 R, 35 R; 384/58, 622, 621

(56) References Cited

U.S. PATENT DOCUMENTS

| 910,727 A | | 1/1909 | Ross | |
|---|---|---|---|---|
| 2,713,179 A | * | 7/1955 | Clifton | ........................... 16/47 |
| 2,905,964 A | | 9/1959 | Hull | |
| 3,047,904 A | | 8/1962 | MacDonald | |
| 3,246,908 A | | 4/1966 | Marvin | |
| 3,402,558 A | | 9/1968 | Hellinger | |
| 3,433,543 A | * | 3/1969 | Eck | .............. 384/621 |
| 3,435,938 A | * | 4/1969 | Warren et al. | ................. 193/37 |
| 3,724,022 A | * | 4/1973 | Alberti et al. | .................. 16/45 |
| 4,125,183 A | * | 11/1978 | Lang | .............................. 16/46 |
| 4,622,860 A | * | 11/1986 | Cametti et al. | ............. 212/175 |
| 5,076,412 A | * | 12/1991 | Huber | .................. 193/35 MD |
| 5,097,565 A | | 3/1992 | Shorey | |
| 5,110,223 A | * | 5/1992 | Koch et al. | .................. 384/620 |
| 5,655,259 A | * | 8/1997 | Look | ........................ 16/18 CG |
| 5,983,451 A | * | 11/1999 | Shouldice | ........................ 16/21 |
| 6,223,388 B1 | * | 5/2001 | Sey | ................................ 16/20 |
| 6,224,267 B1 | * | 5/2001 | Alling | ........................ 384/618 |
| 6,244,417 B1 | * | 6/2001 | Timmer et al. | ......... 193/35 MD |

* cited by examiner

*Primary Examiner*—Thomas B. Will
*Assistant Examiner*—Thomas A. Beach
(74) *Attorney, Agent, or Firm*—Harness Dickey & Pierce P.L.C.

(57) ABSTRACT

A cargo handling system for a narrow body freighter aircraft employs caster rollers. The cargo handling system includes a horizontal panel disposed along a deck surface of the aircraft, and a plurality of caster rollers having a narrow body roller plane height. Each caster roller includes a roller bearing assembly for providing horizontal movement to a load along an axis of motion. A thrust bearing assembly aligns the roller bearing assembly with the axis of motion. A roller bearing support structure suspends the roller bearing assembly at an offset position at the narrow body roller plane height. The thrust bearing assembly includes a plurality of radially positioned needle bearings, and the roller bearing assembly uses roller bearings having a torus-like structure. The bearing assemblies are made of stainless steel to resist foreign object damage.

18 Claims, 5 Drawing Sheets

CASTER ROLLER FOR CARGO HANDLING SYSTEM

FIELD OF THE INVENTION

The present invention generally relates to cargo handling systems for narrow body freighter aircraft. More particularly, the invention relates to a caster roller cargo handling system for a narrow body freighter aircraft.

DISCUSSION

In the aviation industry, aircraft have been designed to serve a wide variety of purposes. For example, modern-day airplanes are used for general aviation, passenger transport, and freighter transport purposes. It is typical for freighter aircraft to vary in size from wide body to narrow body depending on the desired cargo payload. For example, wide body freighters such as the B747 are designed to handle payloads on the order of 200,000 pounds, whereas narrow body freighters are designed to carry cargo payloads on the order of 50,000 pounds. Recently, passenger planes such as the Boeing 757-200 have been modified to meet narrow body freighter purposes.

In all freighter applications it is desirable to maximize the volume of the cargo area. This desire has directed attention to cargo handling system design considerations as well as body design considerations. It is therefore particularly desirable to provide a cargo handling system for a narrow body freighter which meets or exceeds volume requirements for industry standard cargo as well as unique cargo.

Typical cargo handling systems provide a mechanism for loading and unloading cargo containers from decks of the freighter. The cargo containers are loaded on pallets which are moved across the deck on ball mats disposed throughout the deck surface. In order to maximize volume (as well as to ensure proper operation), freighters of all size normally specify a roller plane height with respect to the deck surface. For example, narrow body freighters most commonly have a standard roller plane height of 1.25 inches (3.175 centimeters), whereas wide body freighters most commonly have a specified roller plane height of 1.75 inches (4.445 centimeters). However, it possible to incorporate the roller plane height desired on most freighter aircraft whether the aircraft is a narrow or a wide body since some aircraft have 2.00 inch systems (5.080 centimeters).

While caster rollers have been used for wide body freighter cargo handling systems, conventional designs have not been scalable to the lower roller plane height standard for narrow body freighters. This problem is largely due to the complicated nature of the bearing designs for conventional caster rollers. For example, the conventional caster roller has a roller bearing assembly for contacting the cargo pallet and a thrust bearing assembly which aligns the roller bearing assembly with the axis of motion. The roller bearing assembly has typically employed separate roller and bearing components, causing the overall outside diameter to be too large for narrow body freighter purposes. Furthermore, the thrust bearing assembly generally has a feed-through opening for insertion of individual bearings which adds to assembly costs, reduces durability, and increases part costs.

The inability to use conventional caster rollers for narrow body freighter applications has therefore led to the widespread use of ball mats. Ball mats have a spherical roller instead of a cylindrical roller as in the case of caster rollers. The spherical design creates a point load at the point of contact with the pallet. The point load forces are much higher than the line load forces which would be created with a cylindrical roller. Over time, the point load causes pallets to curl up, which is sometimes referred to as "cold working". Cold working is detrimental to pallets and is extremely undesirable. The creation of a point load also requires the use of a larger number of ball rollers to sufficiently distribute the weight of the pallet and cargo container.

Another shortcoming of ball mats is the increased problem with "FOD" (foreign object damage). FOD occurs when particles of dust, grease, oil, moisture, etc. penetrate the area between the housing of the ball roller and the ball. FOD substantially reduces the durability of ball mats and ultimately leads to increased warranty claims. It is therefore desirable to provide a cargo handling system which can avoid the problems associated with ball mats, yet still meet the volume requirements of narrow body freighters.

SUMMARY OF THE INVENTION

In accordance with the present invention, a cargo system for a narrow body freighter aircraft includes a horizontal panel, a plurality of caster rollers, and an attachment system. The horizontal panel is disposed along a deck surface of the aircraft, and the plurality of caster rollers movably supports a load within the aircraft. Each caster roller has a plurality of roller bearings for providing horizontal movement to the load along an axis of motion. The attachment system couples the caster rollers to the horizontal panel. Thus, the aforementioned problems associated with ball mats can be avoided.

Further in accordance with the present invention, a caster roller for a freighter aircraft cargo handling system includes a roller bearing assembly having a plurality of roller bearings providing horizontal movement to a load along an access of motion. A thrust bearing assembly having a plurality of radially positioned needle bearings aligns the roller bearing assembly with the axis of motion. The caster roller further includes a housing having internal surfaces defining a drop-in channel, and a roller bearing support structure. The drop-in channel contains the thrust bearing assembly, and the roller bearing support structure suspends the roller bearing assembly at a predetermined roller plane height.

The present invention also provides a method for supporting cargo within an aircraft. The method includes the step of using at least one roller bearing to support the cargo thereon. The roller bearing is disposed for rotational movement relative to a support structure such that the roller bearing is disposed at a predetermined height above the support structure. The support structure is supported on a plurality of radially positioned needle bearings to enable the support structure to rotate about an axis normal to a rotational axis of the roller bearing. A ring member is used to support the radially positioned needle bearings, and portions of the ring member are secured to a floor support panel such that the needle roller protrudes outwardly of an outer surface of the support panel.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and sub-joined claims and by referencing the following drawings in which:

DETAILED DESCRIPTION OF THE PREFERRED EMBODIMENTS

Figure 1:
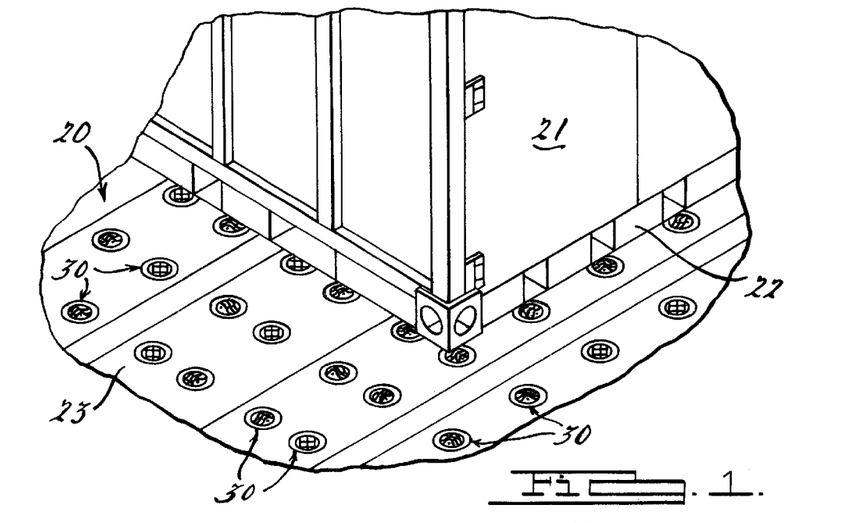
FIG. 1 is a perspective view of a cargo handling system for a narrow body freighter aircraft according to the present invention.

FIG. 1 shows a cargo handling system 20 for a narrow body freighter aircraft. Generally, the handling system 20 facilitates movement of cargo container 21 which is placed upon pallet 22. Handling system 20 includes a horizontal panel 23 disposed along a deck surface of the aircraft, and a plurality of caster rollers 30 preferably having a narrow body roller plane height. An attachment system couples the caster rollers 30 to the horizontal panel 20. The attachment system can be any type of conventional configuration such as that shown in U.S. Pat. No. 5,097,565 to Shorey, incorporated herein by reference.

Figures 2, 3:
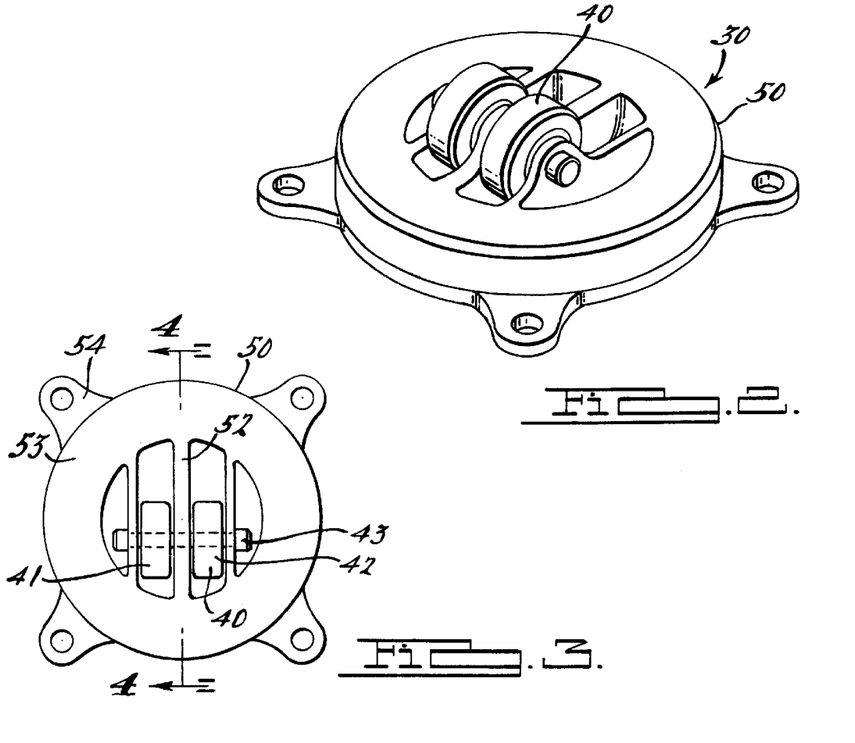
FIG. 2 is a perspective view of a caster roller according to one embodiment of the present invention.
FIG. 3 is a top view of the caster roller shown in FIG. 2.

FIG. 2 shows a perspective view of caster roller 30 in accordance with one embodiment of the present invention. Caster roller 30 has a roller bearing assembly 40 for providing horizontal movement to a load along an axis of motion. A thrust bearing assembly, to be discussed later, has an associated thrust bearing circumference and aligns the roller bearing assembly 40 with the axis of motion.

Figure 4:
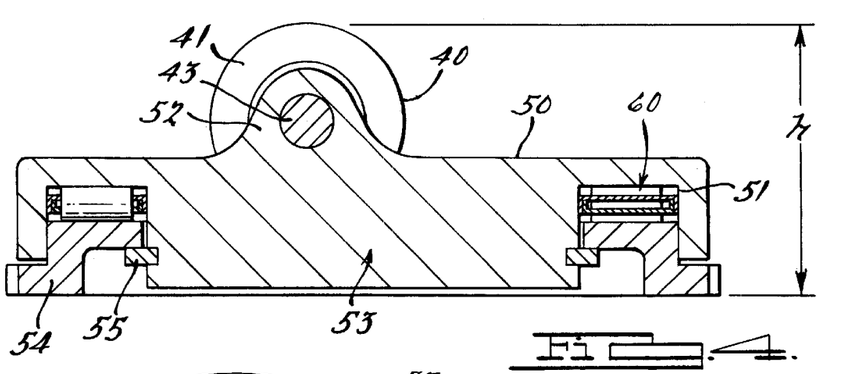
FIG. 4 is a cross sectional view of the caster roller shown in FIG. 3 taken along lines 4—4 in FIG. 3.

Turning now to FIGS. 3 and 4, it can be seen that a housing 50 of the caster roller 30 has a drop-in channel 51 and a roller bearing support structure 52. The drop-in channel 51 contains the thrust bearing assembly 60. The roller bearing support structure 52 suspends the roller bearing assembly 40 at a coaxially offset position within the thrust bearing circumference and suspends the roller bearing assembly 40 at the narrow body roller plane height h in relation to the horizontal panel 23 (FIG. 1). The narrow body roller plane height h is defined by customer requirements, however, at the present time, a roller plane height of 1.25 inches is common in the industry. It will be appreciated, however, that the present invention is not limited to use with any particular height standard, but could be used in applications involving a variety of different height requirements or standards.

Figure 13:
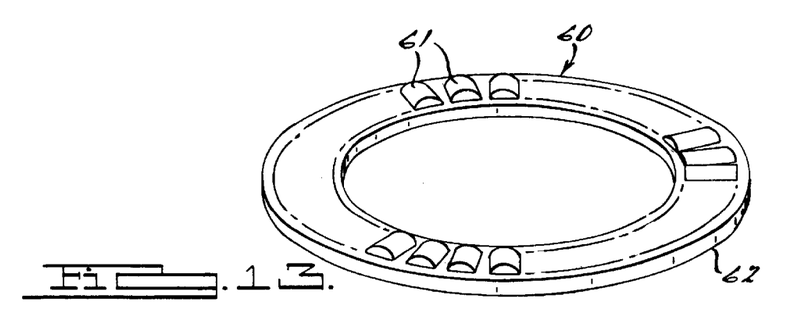
FIG. 13 is a perspective view of a thrust bearing assembly according to the present invention.

Turning now to FIG. 13, it can be seen that the thrust bearing assembly 60 includes a plurality of radially positioned needle bearings 61 contained within a thrust bearing ring 62. An acceptable thrust bearing assembly 60 is sold by the Torrington bearing company under the part number FP50749 or FP43025. It is preferred that the radially positioned needle bearings 61 are made of stainless steel to better resist FOD.

Returning now to FIGS. 3 and 4, it can be seen that the roller bearing assembly 40 preferably includes a first roller bearing 41, a second roller bearing 42, and an axle 43 rotatably coupled to the housing 50. The axle 43 extends through the first roller bearing 41 and the second roller bearing 42 such that the first roller bearing 41 is linearly aligned with the second roller bearing 42. Roller bearings 41 and 42 have a torus structure and can be purchased from a variety of independent bearing companies. It is preferred that roller bearings 41 and 42, and axle 43 are made of stainless steel to prevent corrosion.

Figure 5:
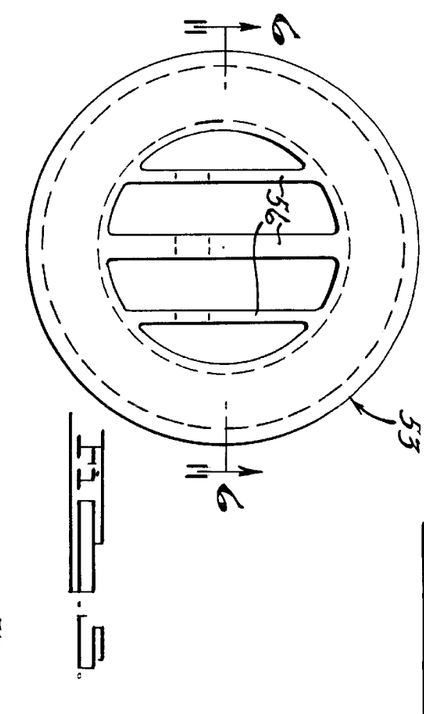
FIG. 5 is a top view of just a top ring according to one embodiment of the present invention.
Figures 6, 7:
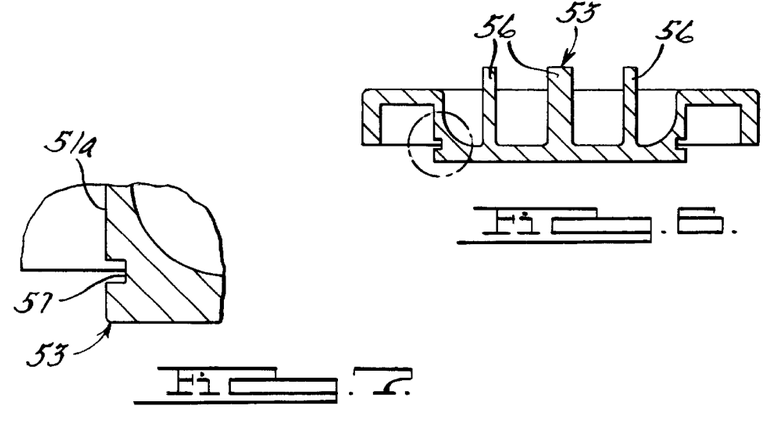
FIG. 6 is a cross sectional view of the top ring shown in FIG. 5 taken along lines 6—6 in FIG. 5.
FIG. 7 is an enlarged view of area D shown in FIG. 6.
Figures 8, 9:
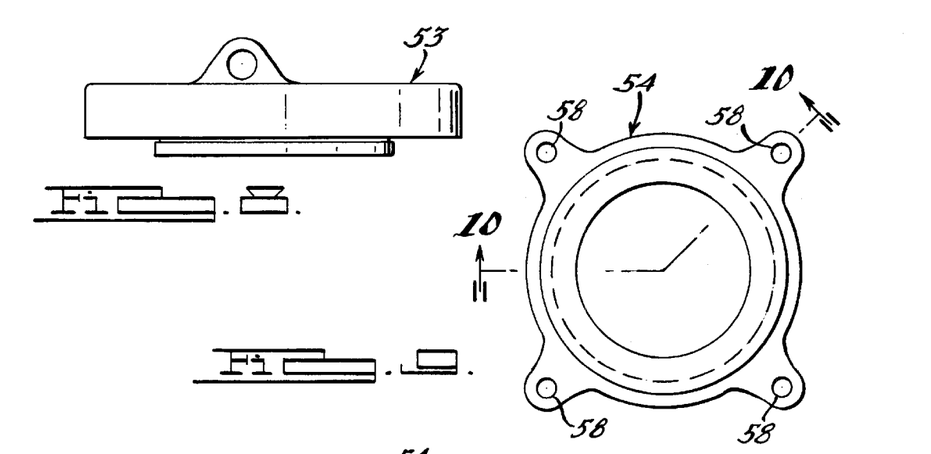
FIG. 8 is a side view of the top ring shown in FIG. 5.
FIG. 9 is a bottom view of a bottom ring according to the present invention.

Housing 50 preferably includes a top ring 53, a bottom ring 54, and a connection mechanism 55. The connection mechanism 55 couples the top ring 53 to the bottom ring 54 such that the thrust bearing assembly can be retained within the drop-in channel 51. Turning now to FIGS. 5 and 6, it can be seen that top ring 53 has a plurality of struts 56 for suspending the roller bearing assembly 40 (FIG. 4). FIG. 7 shows an enlarged view of a retaining notch or groove 57 disposed on an inner wall 51a of the drop-in channel 51, wherein the retaining notch 57 receives the connection mechanism 55 (FIG. 4). Preferably, connection mechanism 55 is a resilient retaining ring. FIG. 8 shows a side view of the top ring 53 shown in FIG. 5.

Figure 10:
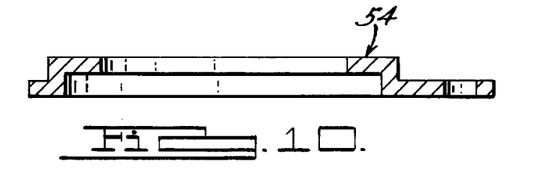
FIG. 10 is a cross sectional view of the bottom ring shown in FIG. 9 taken along lines 10—10 in FIG. 9.
Figure 11:
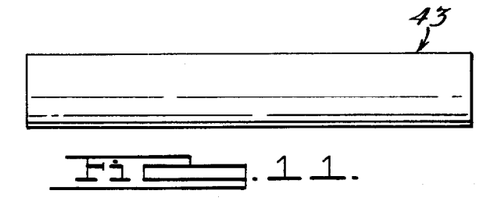
FIG. 11 is a side view of a roller bearing assembly axle according to the present invention.
Figure 12:
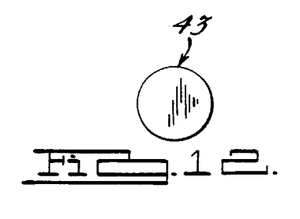
FIG. 12 is an end view of the axle shown in FIG. 11.

FIGS. 9 and 10 show bottom ring 54 in greater detail. Specifically, FIG. 9 is a bottom view of bottom ring 54. It will be appreciated that the caster roller 30 (FIG. 2) is attached to the horizontal panel 23 (FIG. 1) through attachment holes 58. The attachment system can therefore couple the caster roller 30 to the horizontal panel 23 via nut and bolt fastening mechanisms well known in the art. The cross-sectional view of FIG. 10 demonstrates the structure of bottom plate 54 in greater detail. FIGS. 11 and 12 show axle 43 of roller bearing assembly 40 (FIGS. 3 and 4) in greater detail.

The use of a modified roller bearing assembly 40 and thrust bearing assembly 60 therefore allows the narrow body roller plane height h to be achieved with caster rollers. The resulting cargo handling system 20 has substantially increased durability and resistance to FOD and corrosion. Cold working is also eliminated by creating line loads. Line loading also allows fewer caster rollers 30 to be used in a given application.

Figure 14:
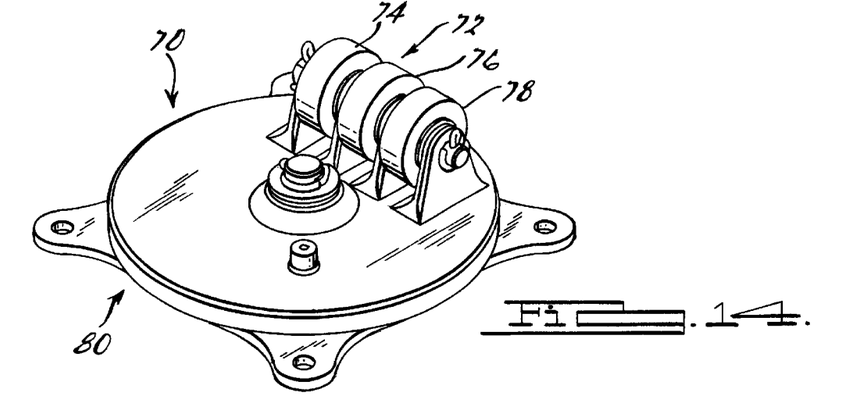
FIG. 14 is a perspective view of a castor roller according to a preferred embodiment of the present invention.

Turning now to FIG. 14, a preferred embodiment will be described in greater detail. Specifically, it can be seen that the preferred caster roller 70 includes a roller bearing assembly 72 having a plurality of roller bearings 74, 76, 78 for providing horizontal movement to a load along an axis of motion. As will be discussed in greater detail below, the caster roller 70 further includes a thrust bearing assembly and a housing assembly 80.

Figure 15:
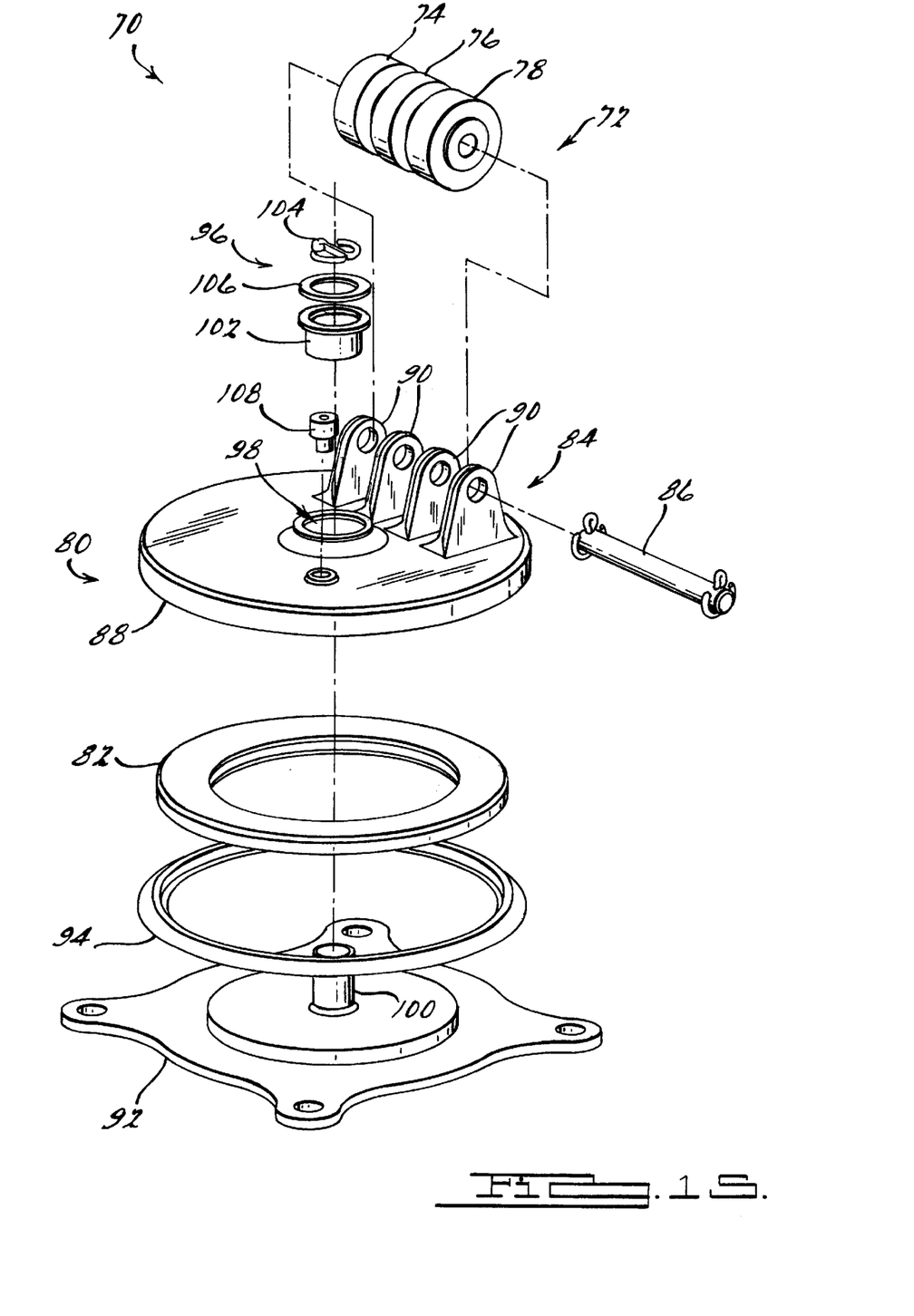
FIG. 15 is an exploded perspective view of the caster roller shown in FIG. 14.
Figure 16:
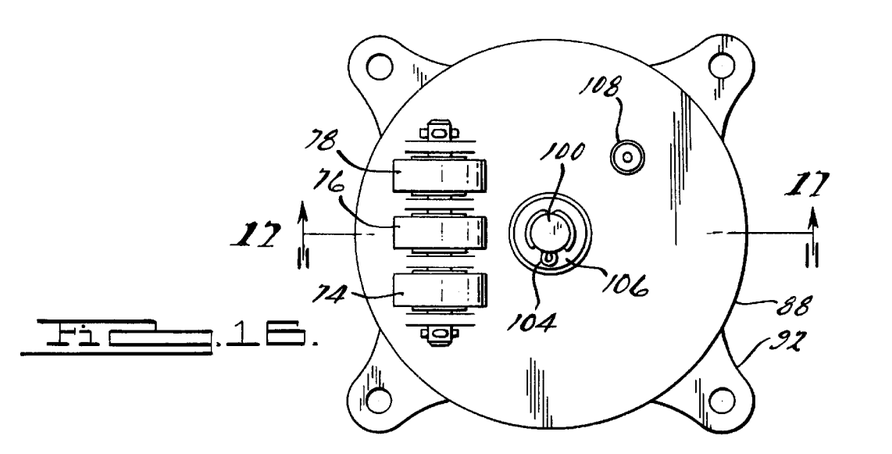
FIG. 16 is a top view of the caster roller shown in FIG. 14.
Figure 17:
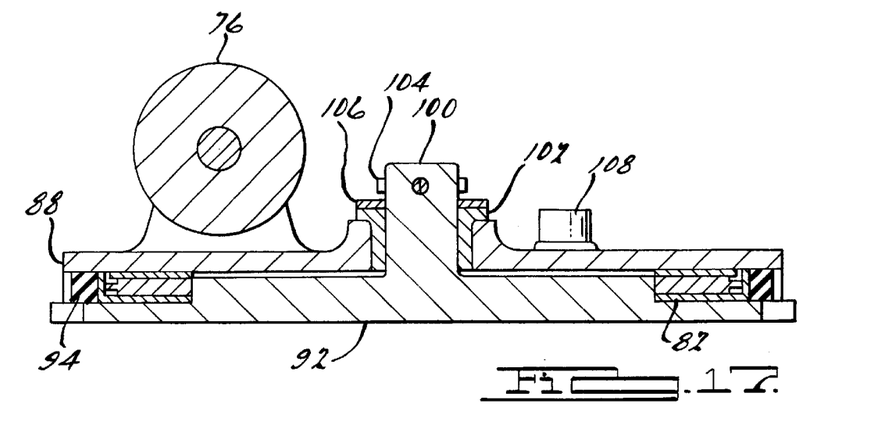
FIG. 17 is a cross sectional view of the caster roller shown in FIG. 16 taken along lines 17—17 in FIG. 16.

FIGS. 15–17 provide an exploded view of the caster roller 70. It can be seen that a thrust bearing assembly 82 has a plurality of radially positioned needle bearings (described above) for aligning the roller bearing assembly 72 with the axis of motion. The housing assembly 80 has internal surfaces defining a drop-in channel, where the drop-in channel contains the thrust bearing assembly 82. The drop-in channel will be described in greater detail below. The housing assembly further includes a roller bearing support structure 84 for suspending the roller bearing assembly 72 at a predetermined roller plane height. As already discussed, it is highly preferred that the predetermined roller plane height correspond to the height specified for narrow body freighter aircraft (namely 1.25 inches).

The plurality of roller bearings include a first roller bearing 74, a second roller bearing 76, and a third roller bearing 78. The roller bearing assembly 72 further includes an axle 86 rotatively coupled to the housing 80. The axle 86 extends through the first roller bearing 74, the second roller bearing 76, and the third roller bearing 78 such that the roller bearings 74, 76, 78 are linearly aligned. It can further be seen that the roller bearing support structure 84 suspends the roller bearing assembly 72 at a coaxially offset position. The unique design for the roller bearings 74, 76, 78 and the thrust bearing assembly 82 allows the roller bearing assembly to be positioned in this location. It is important to note that conventional roller bearing assemblies do not use the structurally solid roller bearings of the present invention for aircraft cargo handling systems.

It can further be seen that the housing assembly 80 has a housing 88 with a plurality of struts 90 for suspending the roller bearing assembly 72. The housing assembly 80 also has a base 92, and a sealing ring 94 disposed between the housing 88 and the base 92. A connection mechanism 96 couples the housing 88 to the base 92 such that internal surfaces of the housing 88, the sealing ring 94, and the base 92 define the drop-in channel.

It can further be seen that the housing 88 has surfaces defining a center opening 98. The base 92 has a protrusion 100 extending through the center opening 98 to provide the connection mechanism 96 with a point of attachment. Specifically, it is preferred that the connection mechanism 96 include a bushing 102 rotatably coupled to the protrusion 100, and a cotter pin 104 coupled to an end of the protrusion 100. A washer 106 is rotatably coupled to the protrusion 100 between the bushing 102 and the cotter pin 104 to facilitate rotation. The housing 80 also has a removable lubricant fitting for enabling insertion of lubricants into the caster roller 70.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and the following claims.

What is claimed is:

1. A cargo handling system for an aircraft, the cargo handling system comprising:
   a horizontal panel disposed along a deck surface of the aircraft;
   a plurality of caster rollers moveably supporting a load within the aircraft, each said caster roller having a plurality of structurally solid roller bearings coaxially aligned to each other for providing horizontal movement to the load along an axis of motion;
   an attachment system for coupling the caster rollers to the horizontal panel;
   wherein each caster roller further includes a housing assembly having a support structure for suspending a substantial portion of the roller bearing assembly at a predetermined roller plane height above the housing assembly.

2. The cargo handling system of claim 1 wherein each said caster roller further includes:
   a thrust bearing assembly having a plurality of radially positioned needle bearings for aligning the roller bearing assembly with the axis of motion; and
   the housing assembly has internal surfaces defining a drop-in channel, the drop-in channel containing the thrust bearing assembly.

3. The cargo handling system of claim 2 wherein the plurality of roller bearings include a first roller bearing, a second roller bearing, and a third roller bearing, the roller bearing assembly further including an axle rotatably coupled to the housing, the axle extending through the first roller bearing, the second roller bearing, and the third roller bearing such that the roller bearings are linearly aligned.

4. The cargo handling system of claim 3 wherein the roller bearings are made of stainless steel.

5. The cargo handling system of claim 2 wherein the radially positioned needle bearings are made of stainless steel.

6. The cargo handling system of claim 5 wherein the predetermined roller plane height is approximately 1.25 inches above the horizontal panel disposed along the deck surface of the aircraft.

7. The cargo handling system of claim 2 wherein the housing assembly includes:
   a housing having a plurality of struts for suspending the roller bearing assembly;
   a base;
   a sealing ring disposed between the housing and the base; and
   a connection mechanism for coupling the housing to the base such that internal surfaces of the housing, the sealing ring, and the base define the drop-in channel.

8. A caster roller for a freighter aircraft cargo handling system, the caster roller comprising:
   a roller bearing assembly having a plurality of roller bearings for providing horizontal movement to a load along an axis of motion;
   a thrust bearing assembly having a plurality of radially positioned roller bearings for aligning the roller bearing assembly with the axis of motion; and
   a housing assembly having internal surfaces defining a drop-in channel, the drop-in channel containing the thrust bearing assembly, the housing assembly further including a roller bearing support structure, the roller bearing support structure suspending the roller bearing assembly at a predetermined roller plane height substantially above the housing assembly.

9. The caster roller of claim 8 wherein the plurality of roller bearings include a first roller bearing, a second roller bearing and a third roller bearing, the roller bearing assembly further including an axle rotatably coupled to the housing, the axle extending through the first roller bearing, the second roller bearing, and the third roller bearing such that the roller bearings are linearly aligned.

10. The caster roller of claim 9 wherein the roller bearings are made of stainless steel.

11. The caster roller of claim 8 wherein the radially positioned needle bearings are made of stainless steel.

12. The caster roller of claim 11 wherein the predetermined roller plane height is approximately 1.25 inches above a horizontal panel disposed along a deck surface of the aircraft.

13. The caster roller of claim 8 wherein the roller bearing support structure suspends the roller bearing assembly at a position such that the roller bearings are coaxially aligned.

14. The caster roller of claim 13 wherein the housing assembly includes:
  a housing having a plurality of struts for suspending the roller bearing assembly;
  a base;
  a sealing ring disposed between the housing and the base; and
  a connection mechanism for coupling the housing to the base such that internal surfaces of the housing, the sealing ring, and the base define the drop-in channel.

15. The caster roller of claim 14 wherein the housing has surfaces defining a center opening and the base has a protrusion extending through the center opening, the connection mechanism including:
  a bushing rotatably coupled to the protrusion;
  a cotter pin coupled to an end of the protrusion; and
  a washer rotatably coupled to the protrusion between the bushing and the cotter pin.

16. The caster roller of claim 14 wherein the housing includes a lubricant fitting for enabling insertion of lubricants into the caster roller.

17. A method for moveably supporting cargo within an aircraft, the method comprising the steps of:
  using at least one roller bearing to support said cargo thereon;
  disposing said one roller bearing for rotational movement relative to a support structure such that said one roller bearing is substantially disposed at a predetermined height above said support structure;
  supporting said support structure on a plurality of radially positioned needle bearings to enable said support structure to rotate about an axis normal to a rotational axis of said roller bearing;
  using a ring member to support said radially positioned needle bearings; and
  securing portions of said ring member to a floor support panel such that said roller bearing protrudes outwardly of an outer surface of said support panel.

18. The method of claim 17 wherein the step of supporting said radially positioned needle bearings includes the steps of:
  forming a recess in a surface of said support structure
  placing said radially positioned needle bearings in said recess;
  placing said ring member over said radially positioned needle bearings; and
  using a connecting member to secure said ring member to said support structure to sandwich said thrust bearing therebetween.

* * * * *

UNITED STATES PATENT AND TRADEMARK OFFICE
CERTIFICATE OF CORRECTION

PATENT NO. : 6,604,258 B2
DATED : August 12, 2003
INVENTOR(S) : Rosario S. Saggio et al.

It is certified that error appears in the above-identified patent and that said Letters Patent is hereby corrected as shown below:

Column 1,
Line 43, "it" should be -- it is --

Column 4,
Line 59, remove "and corrosion" after "FOD"
Line 65, remove "the preferred" after "that"

Signed and Sealed this

Twenty-first Day of October, 2003

JAMES E. ROGAN
*Director of the United States Patent and Trademark Office*